I. B. LUTZ.
Seed-Planter.
No. 19,859.
Patented Apr. 6, 1858.
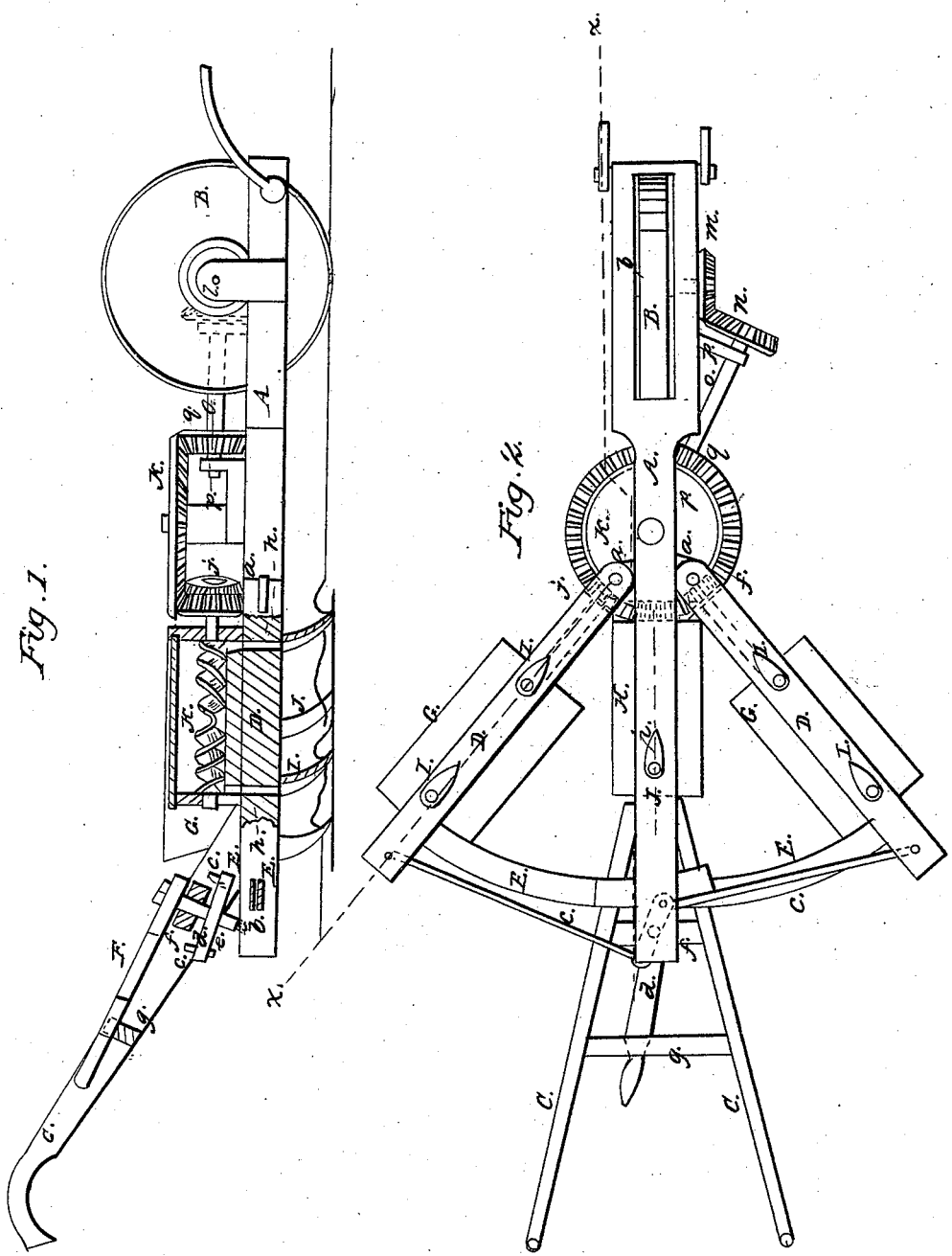

UNITED STATES PATENT OFFICE.

I. B. LUTZ, OF LAFAYETTE, INDIANA.

IMPROVEMENT IN SEEDING-MACHINES.

Specification forming part of Letters Patent No. 19,859, dated April 6, 1858.

*To all whom it may concern:*

Be it known that I, ISAAC B. LUTZ, of Lafayette, in the county of Tippecanoe and State of Indiana, have invented a new and Improved Seeding-Machine; and I do hereby declare that the following is a full, clear, and exact description of the same, reference being had to the annexed drawings, making a part of this specification, in which—

Figure 1 is a side sectional elevation of my improvement, the plane of section passing vertically and longitudinally through one of the seed-boxes, as indicated by the line $x\,x$, Fig. 2. Fig. 2 is an inverted plan of the same.

Similar letters of reference indicate corresponding parts in the two figures.

This invention is chiefly designed for sowing seed broadcast among standing corn; and it consists in a novel means employed for distributing the seed and in a peculiar arrangement of the seed boxes and shares, whereby the same are rendered capable of adjustment, so that the implement, while in motion, may be expanded or contracted at the will of the attendant or operator and made to conform to the varying widths or spaces between the rows of corn, and the manipulation of the implement generally rendered comparatively easy.

To enable those skilled in the art to fully understand and construct my invention, I will proceed to describe it.

A represents a bar or beam, of suitable dimensions, in the front end of which a wheel, B, is placed, and at the back part of which the handles C C are attached.

To each side of the bar or beam A a bar, D, is attached by a hinge or joint, $a$, said hinges or joints being about at the center of the bar or beam.

To the back part of each bar D a curved or segment bar, E, is attached, and the inner ends of these segment bars pass loosely through a mortise, $b$, made in the back part of the bar or beam A.

To the outer end of each bar D a rod, $c$, is attached, and the inner ends of these rods are connected to the ends of a cross-arm, $d$, which is placed on an arbor, $e$, the lower end of which is stepped in the back part of the bar or beam A, the upper end passing through a cross-piece, $f$, which connects the handles C C.

To the upper end of the arbor $e$ a lever, F, is attached, the outer end of which may be secured in either of a series of notches in a cross-piece, $g$, of the handles.

On each bar D a seed-box, G, is placed, and a seed-box, H, is placed on the back part of the beam A, between the two boxes G G.

To the under side of each bar D two shares I I are attached. The shanks $h$ of these shares pass through the bars D, are hollow, and communicate one with the front and the other with the back ends of the seed-boxes G, as shown clearly in Fig. 1.

To the under side of the beam A a share, J, is attached. This share is also provided with a hollow shank, $i$, and it communicates with the back end of the seed-box H.

Within the seed-boxes G G screw-rods K are placed longitudinally—one rod in each box. These rods have each a right and left screw-thread on them, so formed as to throw or carry the seed from the center of the boxes to their outer ends, and the front ends of the rods pass through the front ends of the seed-boxes, and have each a bevel-pinion, $j$, on them, which gear into a horizontal wheel, $k$, attached to the beam A at its center and to its upper surface. The central seed-box, H, is provided with a rod having but one screw-flange and one share. The screw-rod of the central seed-box is provided with a pinion, which also gears into the wheel $k$ on the beam A.

On the axle $l$ of the wheel B a bevel-pinion, $m$, is placed, and this pinion gears into a corresponding pinion, $n$, on a shaft, $o$, the bearings $p$ of which are attached to the beam A. The inner end of the shaft $o$ has a pinion, $q$, on it, and this pinion gears into the wheel $k$.

The operation is as follows: As the implement is drawn along, motion is communicated to the wheel $k$ by means of the gearing $m\,n\,q$, and the screw-rods in the seed-boxes G G H are also rotated in consequence of their pinions gearing into the wheel $k$. The rods K of the boxes G have each a right and left screw-flange on them, as shown, and convey the seed from the center to the ends of the boxes and feed it into the hollow shanks $h$ of the shares I I. By this arrangement the seed in each box G is fed into the shares, which, in consequence of being attached to diagonal bars D at a requisite distance apart, distribute their seed in parallel rows having a short space between them. The seed-box H is therefore provided with one share only, J, as one can only be used, and its rod, consequently, is provided with one screw-flange only, a right and left one, of course, not being required.

The bars D may be expanded or contracted—that is to say, their outer ends may be adjusted nearer to or farther from the beam A at any time while the implement is being drawn along, so that the implement may be made to conform in width to the spaces between the rows by adjusting the lever F, through which the cross-arm $d$ is actuated.

By this implement wheat may be successfully sowed among corn, as the implement may be readily expanded and contracted to conform to the varying width of the rows, and the seed may be drilled into parallel rows but a short distance apart. The sowing of corn-land with wheat is frequently done in the Western states, particularly on prairie-soil exposed at every point to the winds, for the standing stalks protect the grain by preventing during the winter the snow and soil in exposed portions from being blown off from it.

I am aware that cultivators and implements for analogous purposes have been so arranged that they could be expanded and contracted, and I am also aware that screw-rods have been placed within the seed-boxes for the purpose of distributing seed; but I am not aware that screw-rods have been provided with two different threads or flanges placed in reverse positions, so as to feed or conduct the grain from the center to the ends of the seed-boxes. I do not claim, therefore, the adjustable bars D, separately; nor do I claim, broadly, the employment of screw-rods for discharging the seed from the seed-boxes; but,

Having thus described my invention, what I claim as new, and desire to secure by Letters Patent, is—

1. The rotating rods K, provided with two screw-threads placed in reverse positions, and so arranged as to discharge the seed at both ends of their seed-boxes G, substantially as and for the purpose set forth.

2. The seed-boxes G G H, attached, respectively, to the adjustable bars D and beam A, and provided with seed-distributing screw-rods operated from the driving-wheel B through the medium of the gearing $m\, n\, q\, j\, j\, j$, substantially as set forth.

ISAAC B. LUTZ.

Witnesses:
T. W. GRAHAM,
JOHN LEVERING.